Oct. 15, 1940.  W. C. LAUGHLIN  2,217,690

TOP SURFACE CLEANER FOR FILTER BEDS

Filed July 13, 1939

INVENTOR.
WILLIAM C. LAUGHLIN

BY C. P. Grupel
ATTORNEY.

Patented Oct. 15, 1940

2,217,690

UNITED STATES PATENT OFFICE 2,217,690

TOP SURFACE CLEANER FOR FILTER BEDS

William C. Laughlin, New York, N. Y., assignor to W. C. Laughlin Corporation, New York, N. Y., a corporation of New York Application July 18, 1939, Serial No. 285,077

2 Claims. (Cl. 210—128)

This invention relates to top surface cleaners for filter beds used in connection with the clarification of waters, sewage, industrial waste waters, etc., and has for its object to provide an improved top surface cleaner.

More particularly, the invention relates to the invention described in my co-pending application, Serial No. 154,226, filed July 17, 1937, for Filtering systems, devices used therein, and methods of filtration, and the present invention is an improvement thereof.

In the former, the top surface cleaner was provided with a sled or shoe, which caused the very thin top layer of the filter bed to be scooped from the filter bed proper, and while so removed was subjected to the action of a paddle wheel. This scooping shoe in the former served another purpose, namely, to act as a sled to support the paddle wheel and the mechanism attendant it, and the support naturally was upon the diminished filter bed, instead of upon the filter bed proper.

The present improvement consists therein in providing sleds running upon the normal top surface of the filter bed, and consists in having the paddle wheel acting directly upon the uppermost surface of the filter bed, so as to momentarily remove it from the filter bed proper and thereupon cause the matter which formed the top surface to be returned to the filter bed proper.

The invention consists further in providing a hood enclosing the draw off pipe, to which hood at each side thereof transversely of the filter bed, sled portions are provided having runners which act directly upon the top surface of the filter bed.

The invention will be more fully described hereinafter, embodiments thereof shown in the drawing, and the invention will be finally pointed out in the claims.

In the accompanying drawing.

Similar characters of reference indicate corresponding parts throughout the various views.

Figure 1:
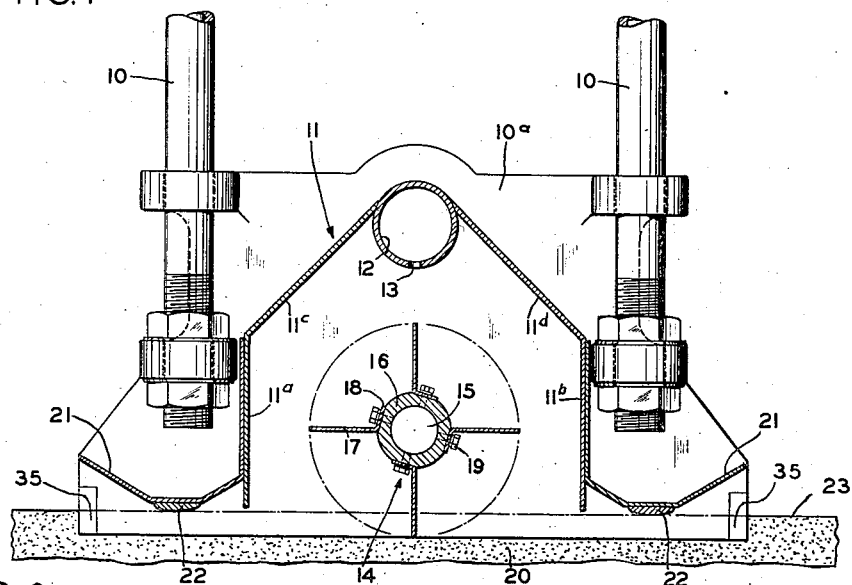
Figure 1 is a vertical transverse section of a top surface cleaner embodying my invention.
Figure 2:
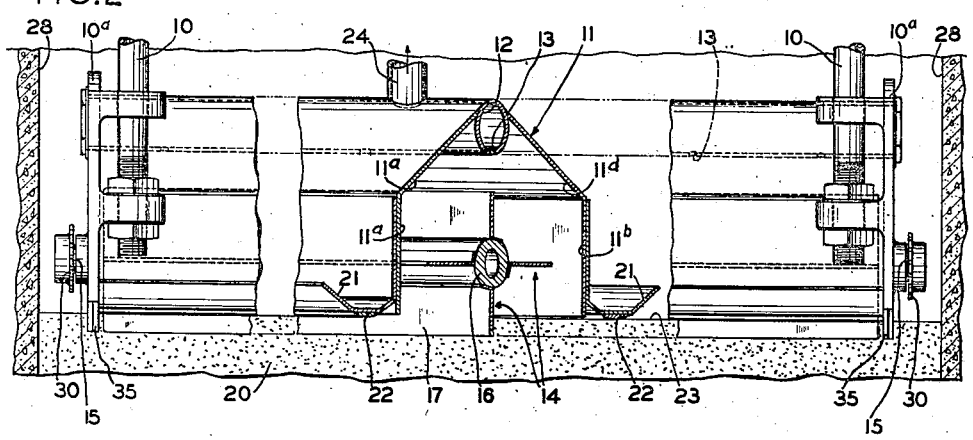
Figure 2 is a front view thereof, with parts broken away and shown in perspective.
Figure 3:
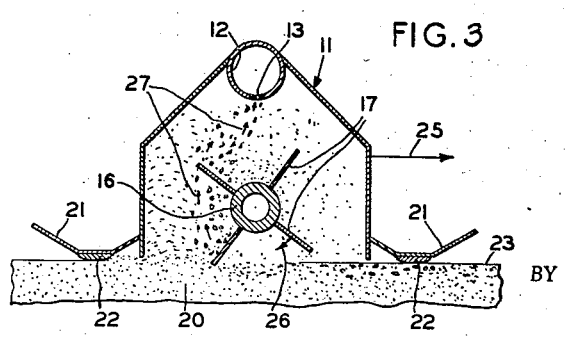
Figure 3 is a diagrammatic drawing of the improved hood with its sled portions, which hood encloses the draw off pipe and the paddle wheel.

Referring to the drawing, in Figures 1 to 3 there is shown a structure which has supports 10 suspended from the movable carriage not shown in this case but shown in the co-pending application, Serial No. 154,226. These two parts 10 support in turn a hood 11, and this hood 11 encloses a draw off pipe 12 having an opening 13. The hood 11 has parallel walls vertically arranged, indicated by 11a and 11b, and these are bent so as to be inclined towards the pipe 12, as indicated by 11c and 11d. The inclined walls 11c and 11d of the hood 11 are placed tangentially in respect to the exterior curved wall of the pipe 12 and are spot welded therewith. The hood 11 extends transversely of the filter bed and is closed at its ends by walls 11e. The side walls 11a and 11b terminate close to the top of the filter bed 20.

Within the hood and substantially equidistantly disposed in respect to the walls of the hood, a paddle wheel 14 is provided which is fixed to a revolving shaft 15 upon which a sleeve 16 is secured, provided with screw threaded openings. The paddles 17 are formed of sheet metal plates bent to angular seating portions 18 having openings through which screw bolts 19 pass and engage the screw threaded openings in the sleeve 16. The paddles 17 have a length so as to enter the filter bed as shown in Figures 1 and 3. The ends of the paddle, when in perpendicular and lowermost position, extend below the lower ends of the walls 11a and 11b of the hood 11. Along each side of the hood 11 and extending also transversely across the filter bed 20 are sleds 21 formed of sheet metal, and having their perpendicular walls suitably fixed to the walls 11a and 11b of the hood, either by welding, braising, or the like, and the sleds 21 have below them runners 22 which rest upon the top surface of the filter bed 20.

To the extent that the lowermost ends of the paddle 17 when in perpendicular position extend below the top surface 23 of the filter bed 20, the filter bed material is plowed or scraped off. As shown in Figure 3, the separated portion of the thin top layer is thrown upwardly in the direction of the draw off pipe 12. Thereby the filter bed material is cleaned, in that dirt or the like is forced upwardly due to the pumping out of the waste water through the pipe 24 which is connected to a pump (not shown), whereas the combined centrifugal and gravity actions to which the heavier filter material is subjected moves the same in a circular direction with the paddles and finally this material settles back upon the filter bed replacing the same and filling any gaps, so that the top surface 23 is again provided. The arrow 25 shows the direction of movement of the top surface cleaner, and the arrow 26 shows the direction of movement of the paddles. The smaller arrows 27 show the direction of the separated dirt and waste water towards and into the pipe 12. The walls of the tank are shown by 28. At the ends of the shaft 15 which extend exterior to the hood 11, sprockets 30 are provided which are operated by chains not shown, so as to rotate the paddle wheel 14.

The openings 13 in the draw off pipe 12 are spaced longitudinally of the pipe.

At the ends of the top surface cleaner as shown in Figure 2, the walls 10a to which the supports 10 are connected, extend downwardly into the filter bed as shown by 35, and enter the top surface of the filter bed to the same extent as the paddle 17, but these entrances are outside of the hood.

The functioning of the paddle wheel 14 directly upon the filter bed brings about a very satisfactory cleaning of the top surface of the same.

The top surface cleaner is moved longitudinally along the length of the filter bed in a position transversely thereto, and this is done continuously, since the top surface fills very quickly from sediments and the like in the water above the filter bed, and by continuously cleaning the top surface the cleaning action of the filter bed is thereby maintained to a very high degree.

The construction described is simple, and operates with efficiency.

From the foregoing, it will have been seen that the novel point is to have the top surface cleaner rest upon the top surface of the filter bed in sled fashion, but to have the cleaning paddle wheel operate directly upon the top surface of the filter bed, and by churning this top surface, i. e., the material thereof, the grains are cleaned by being separated from the soiled material accumulated thereon, and in cleaned fashion are replaced upon the filter bed.

I have described an embodiment of my improved top surface cleaner for filter beds, but it is clear that changes may be made within the principle of the invention described, without departing from the scope of the subjoined claims.

I claim:

1. In a top surface cleaner for filter beds having a screen and filter material disposed thereupon, a paddle wheel having its axis of rotation above the top surface of the filter bed and having end portions of the paddles composing the paddle wheel engage and within the top layer of the filter bed, means for rotating the paddle wheel, a hood enclosing the paddle wheel, and a draw off pipe within the hood for discharging from the interior of the hood water with impurities separated from the filter bed by the agitating action of the paddle wheel directly upon the top surface layer of the filter bed.

2. In a top surface cleaner for filter beds having a screen and filter material disposed thereupon, a paddle wheel having its axis of rotation above the top surface of the filter bed and having end portions of the paddles composing the paddle wheel engage and within the top layer of the filter bed, means for rotating the paddle wheel, a hood enclosing the paddle wheel, and a draw off pipe within the hood for discharging from the interior of the hood water with impurities separated from the filter bed by the agitating action of the paddle wheel directly upon the top surface layer of the filter bed, said hood having sled portions at the lower part thereof for supporting the hood and the paddle wheel directly upon the top surface of the filter bed before it has been removed for the purpose of cleaning the top surface by the paddle wheel action.

WILLIAM C. LAUGHLIN.